United States Patent [19]
Wallace et al.

[11] Patent Number: 5,943,691
[45] Date of Patent: Aug. 24, 1999

[54] DETERMINATION OF ARRAY PADDING USING COLLISION VECTORS

[75] Inventors: David R. Wallace, San Francisco; Gary Oblock, Mountain View, both of Calif.

[73] Assignee: Sun Microsystems, Inc., Mountain View, Calif.

[21] Appl. No.: 08/579,435

[22] Filed: Dec. 27, 1995

[51] Int. Cl.⁶ .................................................. G06F 11/00
[52] U.S. Cl. ..................... 711/172; 711/170; 711/171; 711/118; 711/124; 711/161
[58] Field of Search .................. 395/468, 464, 395/452, 445, 403, 455, 462, 727; 711/3, 118, 125, 128, 135, 137, 141

[56] References Cited

U.S. PATENT DOCUMENTS

| | | | |
|---|---|---|---|
| 5,210,850 | 5/1993 | Kelly et al. | 395/727 |
| 5,249,284 | 9/1993 | Kass et al. | 395/468 |
| 5,361,391 | 11/1994 | Westberg | 395/464 |
| 5,371,865 | 12/1994 | Aikawa et al. | 395/452 |
| 5,511,180 | 4/1996 | Schieve | 395/445 |
| 5,530,958 | 6/1996 | Agarwal et al. | 395/403 |
| 5,548,742 | 8/1996 | Wang et al. | 395/455 |
| 5,553,264 | 9/1996 | Ozveren et al. | 395/462 |

OTHER PUBLICATIONS

Bacon et al., "A Compiler Framework for Restructuring Data Declarations to Enhance Cache and TLB Effectiveness", 1994, Proceedings, Cascon '94 Integrated Solutions.

*Primary Examiner*—John W. Cabeca
*Assistant Examiner*—Fred F. Tzeng
*Attorney, Agent, or Firm*—Beyer & Weaver, LLP

[57] ABSTRACT

A method and apparatus is provided for determining and resolving cache conflicts among data arrays that are stored in the main memory of a computer system in which the main memory is coupled with a memory cache that is coupled in turn with a microprocessor. According to the method of the invention, a cache shape vector that characterizes the size and dimension of the cache is determined under computer control. A determination of at least one cache conflict among the arrays stored in the main memory is then determined, in addition to the conflict region in the cache for the conflicting arrays. A padding value is then determined for the arrays stored in the main memory, and the memory locations of the arrays are adjusted in accordance with the padding value to prevent cache conflicts when the data from the conflicting arrays is transferred from the main memory into the cache.

20 Claims, 8 Drawing Sheets

5,943,691

DETERMINATION OF ARRAY PADDING USING COLLISION VECTORS

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. The Field of the Invention

The present invention relates to the fields of computing systems and the design of compilers for computing systems. More specifically, the present invention provides a method and apparatus for determining the amount of padding to be provided between arrays of data stored in the memory of a computing system.

2. The Relevant Art

The combination of increased microcomputer speeds and memory capacity has been a tremendous benefit for scientific and engineering computing applications. Using today's fastest microprocessors large amounts of data can be processed in relatively short periods of time. This allows for greater accuracy in areas such as image processing and computer simulation of natural phenomenon such as fluid dynamics and weather prediction.

Although computing speeds have increased dramatically at a steadily decreasing cost, computer memory capable of supplying data at a rate comparable to which the microprocessor can process the data is still relatively expensive. Thus, many high performance computing systems still rely on cheaper, slower memory in which to store the large data sets being processed. In order to increase system performance, computer designers have developed a compromise solution in which a small amount of relatively expensive, but very fast memory, such as static random access memory (SRAM), is used to store data that is being accessed frequently by the microprocessor. The bulk of the data resides in the cheaper, slower random access memory (RAM). Data is swapped between the faster memory and the slower memory as needed by the microprocessor. Such a design is referred to generally as "caching".

Typically a cache is divided into lines which consist of a fixed number of sequential memory locations. Each of the lines in the cache has an associated tag register that holds the main memory address of the contents of the cache line. When the microprocessor performs a data access, it maps the address of the main memory onto a fixed number of cache lines. A check is then performed to determine if the address matches any of the tags for the lines. If a match is found, then that line is accessed by the microprocessor and the data is processed. Otherwise, the data access operation is said to "miss" (Ralston 1993).

Typically, when a miss occurs one of the lines in the set is replaced with data from another section of the main memory. Several strategies are available for determining which of the cache lines is to be replaced when a miss occurs. Two commonly used strategies for replacing the contents of a cache line include replacing the contents of the least recently used (LRU) line strategy, and the random strategy in which one cache line is replaced at random. Although these strategies are effective for most situations, problems can arise when the access patterns of different arrays in the software being executed cause those arrays to be mapped onto the same cache lines. In this instance, the performance of the system can become severely degraded as the same cache lines are continually remapped as the processor attempts to access the data from the conflicting arrays. Such an occurrence is referred to as a "cache conflict" and can degrade severely processor performance as repeated data swaps are made during the data processing operations. Because the conflicts arise from conflicting patterns of data access from arrays, cache conflicts tend to occur most frequently in scientific and engineering computing applications as these application often rely on data stored in large arrays. However, any software which processes data in arrays is prone to cache conflicts.

In some cases the use of an associative cache can alleviate cache conflicts, but associative caches are expensive and difficult to implement and still do not provide a general solution to the problem of cache conflicts. Generally, however, when cache conflicts occur a trial-and-error approach is used to determine how much spacing between the conflicting arrays is required to eliminate the conflicting data access patterns. This spacing is also referred to as "padding". A number of attempts have been made to solve the cache conflict problem by determining the necessary padding analytically. One such attempt (Bacon 1993) describes a method for determining array padding to address several causes of cache conflicts. However, this strategy relies heavily on the use of memoization and employs a relatively brute force strategy for detecting conflicts and determining the padding in which the array references for the arrays are compared pairwise to determine if the arrays map to the same cache lines. If the difference between the first dimension of any two arrays is a number multiple of the cache size, a conflict will occur between those arrays and padding between the arrays must be provided. Unfortunately, this scalar approach to detecting and resolving cache conflicts is compositionally inefficient.

The use of high performance computing systems to process large quantities of data, especially data stored in large arrays as commonly done in computing and engineering and scientific computing applications, requires the highest levels of system performance. Currently, achieving such high levels is extremely difficult because of the existence of a cache conflicts. Although some methods are available for resolving these conflicts, they remain inefficient to employ. Thus, it would be advantageous to provide a method and apparatus in which cache conflicts can be predicted and appropriate array paddings determined and implemented in an efficient manner.

SUMMARY OF THE INVENTION

The present invention provides a method and apparatus for determining and implementing array paddings to avoid cache conflicts. Using the method and apparatus of the invention, the potential for conflicts between arrays can be detected in an efficient manner and padding can be determined so as to avoid conflicts during data access operations by a microprocessor. Thus, the present invention will be seen to provide a solution to the problem of achieving the high levels of system performance demanded by most scientific and engineering computing applications.

In one aspect, the present invention provides a method for identifying and resolving cache conflicts among data arrays that are stored in the main memory of a computer system in which the main memory is coupled with a memory cache that is coupled in turn with a microprocessor. According to the method of the invention, a cache shape vector that characterizes the size and dimension of the cache is determined under computer control. A determination of at least one cache conflict among the arrays stored in the main memory is then determined, in addition to the conflict region in the cache for the conflicting arrays. A padding value is then determined for the arrays stored in the main memory, and the memory locations of the arrays are adjusted in accordance with the padding value to prevent cache conflicts when the data from the conflicting arrays is transferred from the main memory into the cache.

According to one embodiment of the present invention, the determination of a cache conflict includes the steps of determining under computer control a collision vector for two arrays stored in the main memory. The collision vector is then compared with the cache shape vector to determine whether the collision vector is an approximate multiple of the cache shape vector. If collision vector is an approximate multiple of the cache shape vector, a cache collision between the arrays used to construct the collision vector is likely to occur. In one embodiment, the collision vector is determined by first ascertaining the number of copies of each array invocation; determining the displacement of each array in the main memory; and converting the numeric value of the displacement into the same numeric base as the collision vector.

In another embodiment, the present invention includes a method for determining the padding among conflicting arrays in which the minimum for the complement of the union of all conflict regions is determined under computer control. In one embodiment, the conflict regions are determined by first determining a conflict interval for each pairwise combination of arrays stored in the main memory. The union of all of the conflict intervals is then determined.

In another aspect, the present invention includes a computer system for determining and resolving cache conflicts. According to one embodiment of the system of the invention, a microprocessor is coupled with a memory cache. The memory cache is coupled in turn to a main memory which has stored therein at least two data arrays. The computer system in this embodiment also includes data pathway and data loading mechanisms effective to transfer at least a portion of the arrays stored in the main memory to the memory cache and load the transferred portion of the arrays into the memory cache. In addition, the computer system includes a cache conflict detection mechanism effective to determine the presence of cache conflicts between the arrays stored in the memory, the cache conflict mechanism including a cache shape vector determination mechanism, and a padding mechanism effective to adjust the main memory locations of the stored arrays to prevent thereby cache conflicts when the stored arrays are transferred and loaded into the memory cache.

Also provided by the present invention is a computer system including a microprocessor coupled with a memory cache coupled with main memory in which are stored data arrays that are loaded into the memory cache for processing by the microprocessor, the memory addresses for the data arrays stored in the main memory being separated by padding regions determined using the above-described method.

In still another aspect, the present invention includes a computer program product comprising a computer usable medium having computer readable code devices embodied therein for identifying and resolving cache conflicts among data arrays stored in the main memory of a computer system in which the data arrays are loaded into a memory cache for processing by a microprocessor. Included in one embodiment of the invention are computer readable code devices for determining under computer control a cache shape vector which characterizes the size and dimension of the memory cache; computer readable code devices for determining under computer control at least one cache conflict between the arrays stored in the main memory; computer readable code devices for determining under computer control the conflict region for the conflicting arrays stored in the main memory; and computer readable code devices for adjusting under computer control the locations of the stored, conflicting arrays in the main memory in accordance with the padding value to prevent thereby cache conflicts when the stored arrays are transferred and loaded into the memory cache.

Also included is a computer readable medium comprising computer readable code devices for defining in the main memory of a computer system at least two arrays that whose locations in the main memory are separated by padding regions determined using the above-described method. In one embodiment, the computer system includes a main memory coupled with a memory cache which is coupled in turn to a microprocessor.

These and other aspects and advantages provided by the present invention will become apparent when the Description below is read in conjunction with the accompanying Drawings.

DESCRIPTION OF SPECIFIC EMBODIMENTS

Figure 1:
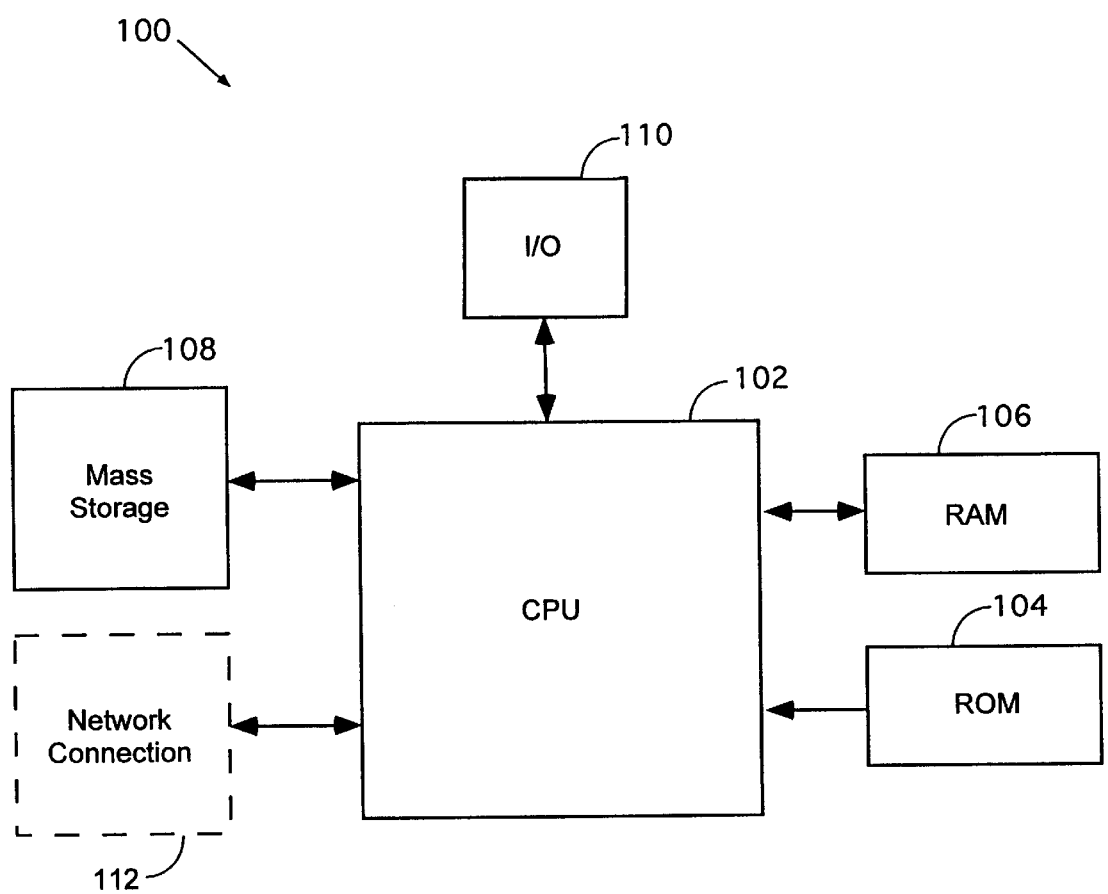
FIG. 1 is a schematic illustration of a computer system in accordance with the present invention.

The present invention employs various process steps involving data stored in computer systems. These steps are those requiring physical manipulation of physical quantities. Usually, though not necessarily, these quantities take the form of electrical or magnetic signals capable of being stored, transferred, combined, compared, and otherwise manipulated. It is sometimes convenient, principally for reasons of common usage, to refer to these signals as bits, values, elements, variables, characters, data structures, or the like. It should be remembered, however, that all of these and similar terms are to be associated with the appropriate physical quantities and are merely convenient labels applied to these quantities.

Further, the manipulations performed are often referred to in terms such as identifying, running, determining, or comparing. In any of the operations described herein that form part of the present invention these operations are machine operations. Useful machines for performing the operations of the present invention include general purpose digital computers or other similar devices. In all cases, there should be borne in mind the distinction between the method of operations in operating a computer and the method of computation itself. The present invention relates to method steps for operating a computer in processing electrical or other physical signals to generate other desired physical signals.

The present invention also relates to an apparatus for performing these operations. This apparatus may be specially constructed for the required purposes, or it may be a general purpose computer selectively activated or reconfigured by a computer program stored in the computer. The processes presented herein are not inherently related to any particular computer or other apparatus. In particular, various general purpose machines may be used with programs written in accordance with the teachings herein, or it may be more convenient to construct a more specialized apparatus to perform the required method steps. The required structure for a variety of these machines will appear from the description given below.

In addition, the present invention further relates to computer readable media which include program instructions for performing various computer-implemented operations. The media and program instructions may be those specially designed and constructed for the purposes of the present invention, or they may be of the kind well known and available to those having skill in the computer software arts. Examples of computer readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM), including erasable programmable read-only memory (EPROM), and random access memory devices (RAM) which RAM includes dynamic random access memory (DRAM), static random access memory (SRAM), and network random access memory (NRAM). Examples of program instructions include both machine code, such as produced by a compiler, and files containing higher level code that can be executed by the computer using an interpreter.

FIG. 1 at 100 shows a typical computer-based system in accordance with the present invention. Shown is a central processing unit 102 (CPU) which is coupled to memory devices including read only memory 104 (ROM) and random access memory 106 (RAM). As is well known in the art, ROM 104 acts to transfer data and instructions unidirectionally to the CPU and RAM 106 is used typically to transfer data and instructions in a bidirectional manner. A mass memory device 108 is also coupled bidirectionally to CPU 102 and provides additional data storage capacity. The mass memory device 108 may be used to store programs, data and the like and may take the form of a magnetic or paper tape reader or some other well known device (e.g., CD-ROM). It will be appreciated that the information retained within the mass memory device 108, may, in appropriate cases, be incorporated in standard fashion as part of RAM 106 in the form of virtual memory. CPU 102 is also coupled to one or more input/output devices 110 (I/O) which include, but are not limited to, devices such as video monitors, trackballs, mice, keyboards, microphones, touch-sensitive displays, transducer card readers, magnetic or paper tape readers, tablets, styluses, voice or handwriting recognizers, or other well-known input devices such as, of course, other computers. Finally, CPU 102 optionally can be coupled to a computer or telecommunications network using a network connection as shown generally at 112. The above-described devices and materials will be familiar to those of skill in the computer hardware and software arts.

Figure 2:
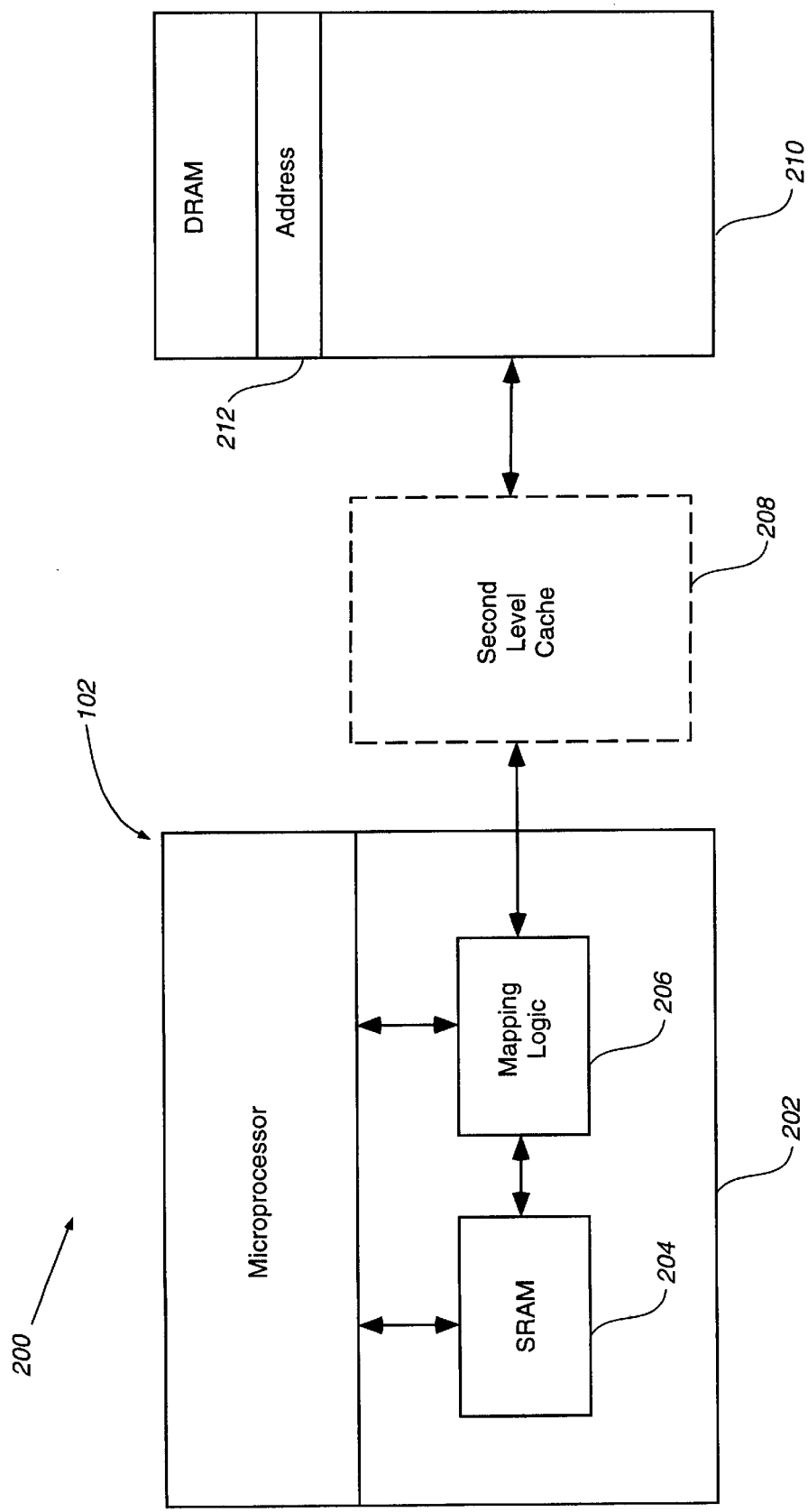
FIG. 2 is schematic illustration of the memory structure used in a computer system in accordance with the present invention.

FIG. 2 at 200 illustrates in greater detail the relationship between main memory such as RAM 104 of FIG. 1, a memory cache, and microprocessor of a computer system in accordance with the present invention. Central processor unit 102 is illustrated as including a microprocessor 202 which microprocessor is in bidirectional communication with a memory cache 204, which in one embodiment is a static random access memory (SRAM), and mapping logic 206. SRAM 204 is of standard design and construction and will be familiar to those of skill in the computer science art. Mapping logic 206 is a hardware device used to map the addresses from the main memory (such as RAM 104) onto the memory cache 204 and is also well known in the art. As illustrated, mapping logic 206 is in bidirectional communication with SRAM 204 in addition to an optional second level cache 208 which typically is memory that is slower than SRAM 204 (which is also referred to a primary cache), but faster than the main memory which is shown at 210 as dynamic random access memory (DRAM). DRAM 210 comprises a plurality of addresses 212 which hold the data being processed by microprocessor 202. Again the elements just described are all of standard construction and known to those of skill in the computer science arts and are described in greater detail in standard references (Ralston 1993; Herzog 1996).

Figure 3:
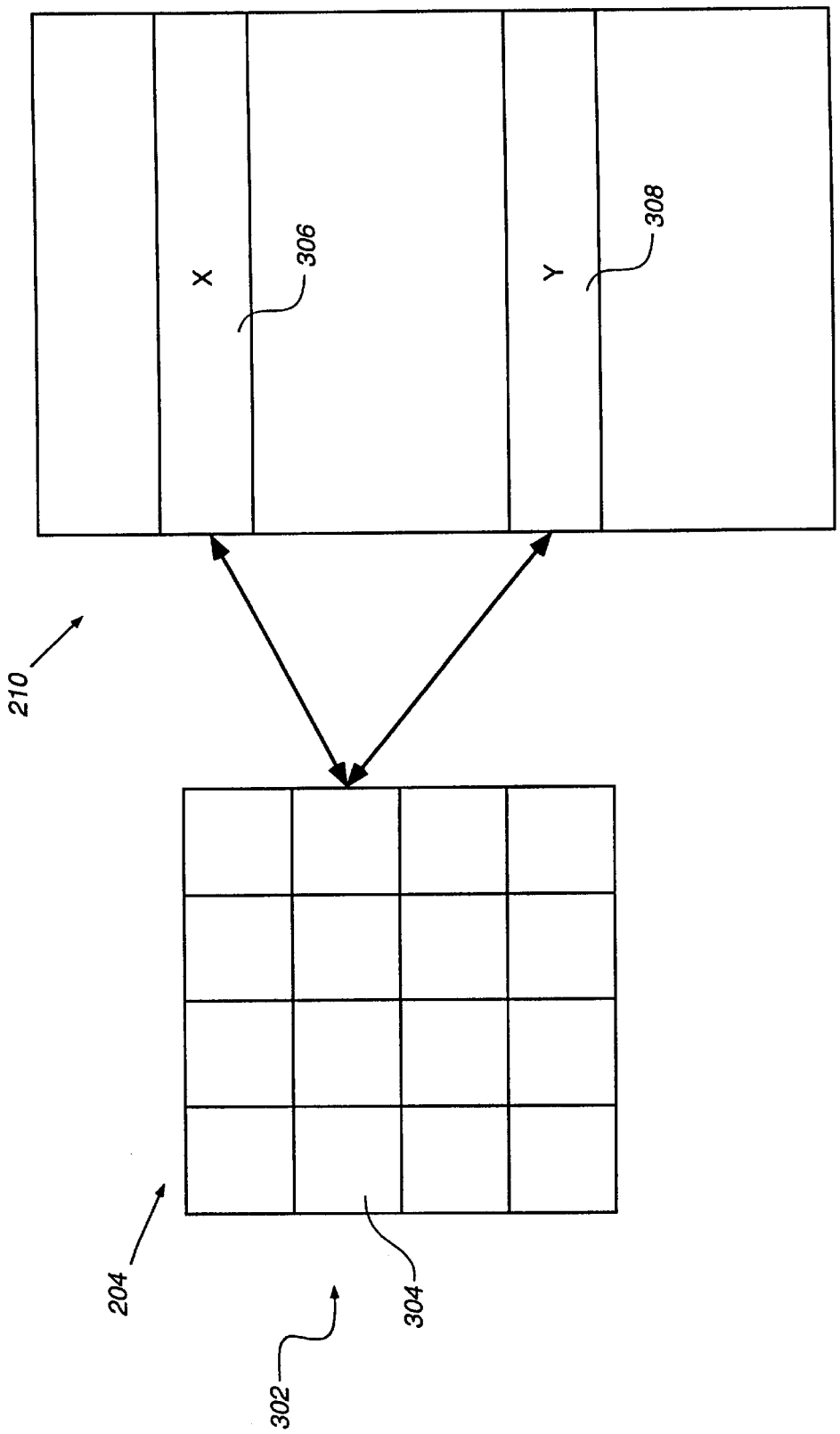
FIG. 3 is a more detailed illustration of the memory cache 204 and main memory 210 of the computer system shown in FIG. 2.

The mechanics of a cache conflict are illustrated in detail with respect to FIG. 3. As shown in the figure, a cache conflict occurs when two different addresses 306 and 308 in main memory 210 are mapped onto the same line 302 of memory cache 204. As shown in the Figure, cache 204 includes a cache line 302 which holds one or more words of data 304. Address 306 comprises a data region "X". Address 308 comprises a data region "Y". Thus, it will be seen that the arrays in both memory addresses 306 and 308 are mapped onto the same cache line 302 and may conflict. However, it will be appreciated by those having skill in the computer science arts that the foregoing description can be applied to memory caches of any size and addresses of any size (e.g., 64-bit addresses) as well as any addressing scheme.

Without wishing to be bound by any particular theory of action, it has been discovered that two or more arrays having a similar "shape" to each other and to the cache (i.e., the arrays and the cache have similar dimensionality and element sizes) are more likely to be mapped onto the same cache line as compared to arrays that vary in dimensionality from each other and/or from the cache. This tendency to be mapped onto the same cache line leads to the above-described cache conflicts as the data from the conflicting arrays is repeatedly written and over-written on the same cache line. Processor cycles are thus wasted as the needed data is repeatedly shuttled to and from the main memory.

To avoid the aforementioned cache conflicts, the present invention provides a method and apparatus for detecting the presence of array structures that will likely result in cache conflicts and padding the arrays so as to ensure that cache conflicts do not occur. One method of implementing the present invention is described with respect to FIGS. 4A and 4B. According to this particular embodiment of the present invention, the method of the invention is applied to machine code which has been compiled by a compiler. It will be appreciated by those having skill in the computer science arts that the method of the invention can be applied with any compiler compiling any type of language (e.g., FORTRAN, BASIC, C, C++, LISP, and the like). It will also be appreciated that the method of the invention can be applied at other levels of the code-generation process. For example, the methods described herein can be applied to the source code and the padding created by including the appropriate padding arrays in the source code directly.

Figure 4A:
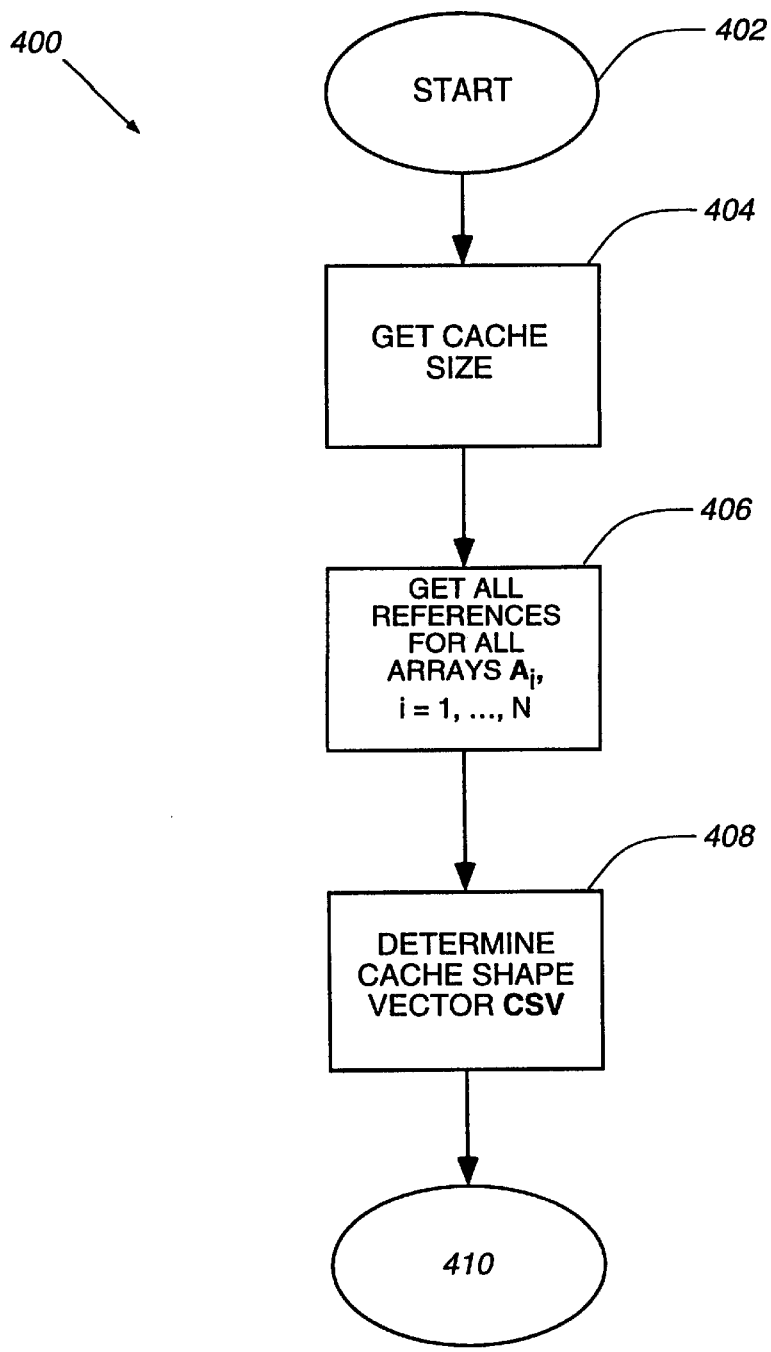
FIGS. 4A and 4B illustrate a method for determining the presence of cache conflicts and appropriate array padding in accordance with the present invention.

As shown at 400 in FIG. 4A, beginning with step 402 the cache size of the memory cache is obtained at step 404 and, at step 406, the references for all of the arrays $A_i$ (i=1, ..., N) declared in the compiled code are determined at step 406. Both steps 404 and 406 can be performed using methods known in the computer science arts. In one embodiment, the cache size is a value input by the user. Other methods for providing the cache size include making an appropriate call to the operating system and checking an appropriate hardware register. In another embodiment, the array references are determined by analysis of the compiled machine code using standard methods, or by analysis of the source code, again using methods known to those of skill in the software arts. At step 408 a cache shape vector CSV is determined which characterizes the dimension and "shape" of the cache.

In one embodiment, CSV is derived by determining the coefficients of the expansion of the cache size C (in the units of the array element size) in the numeric base defined by stride dimension (in words) of the arrays being compared. For example, where M is a D×D (square) array, D being the stride dimension of M (in words), the expression of C in base D is determined using the following expansion (Equation 1):

$$C = p_1 + p_2 \cdot D + p_3 \cdot D^2 \qquad \text{Equation 1}$$

where $p_1$–$p_3$ are the coefficients of expansion. CSV is defined to be the vector whose elements are the coefficients of the expansion in Equation 1: ($p_1$, $p_2$, $p_3$). For example, where D is 257, and C is 65,536, then C is expressed as $1 - 2\cdot(256+1) + 1\cdot(256+1)^2$, corresponding to CSV having the values (1, −2, 1).

For the case of an array of arbitrary dimension, CSV is defined as the vector that satisfies the equation C=B·CSV, where B is the numerical base vector defined below (Equation 2):

$$B = \left(1, D_1, \prod_{i=1}^{2} D_i, \ldots, \prod_{i=1}^{n} D_i\right). \qquad \text{Equation 2}$$

In Equation 2 the quantities $D_i$ are the values of the individual dimensions of the array expressed in units of data words.

Figure 4B:
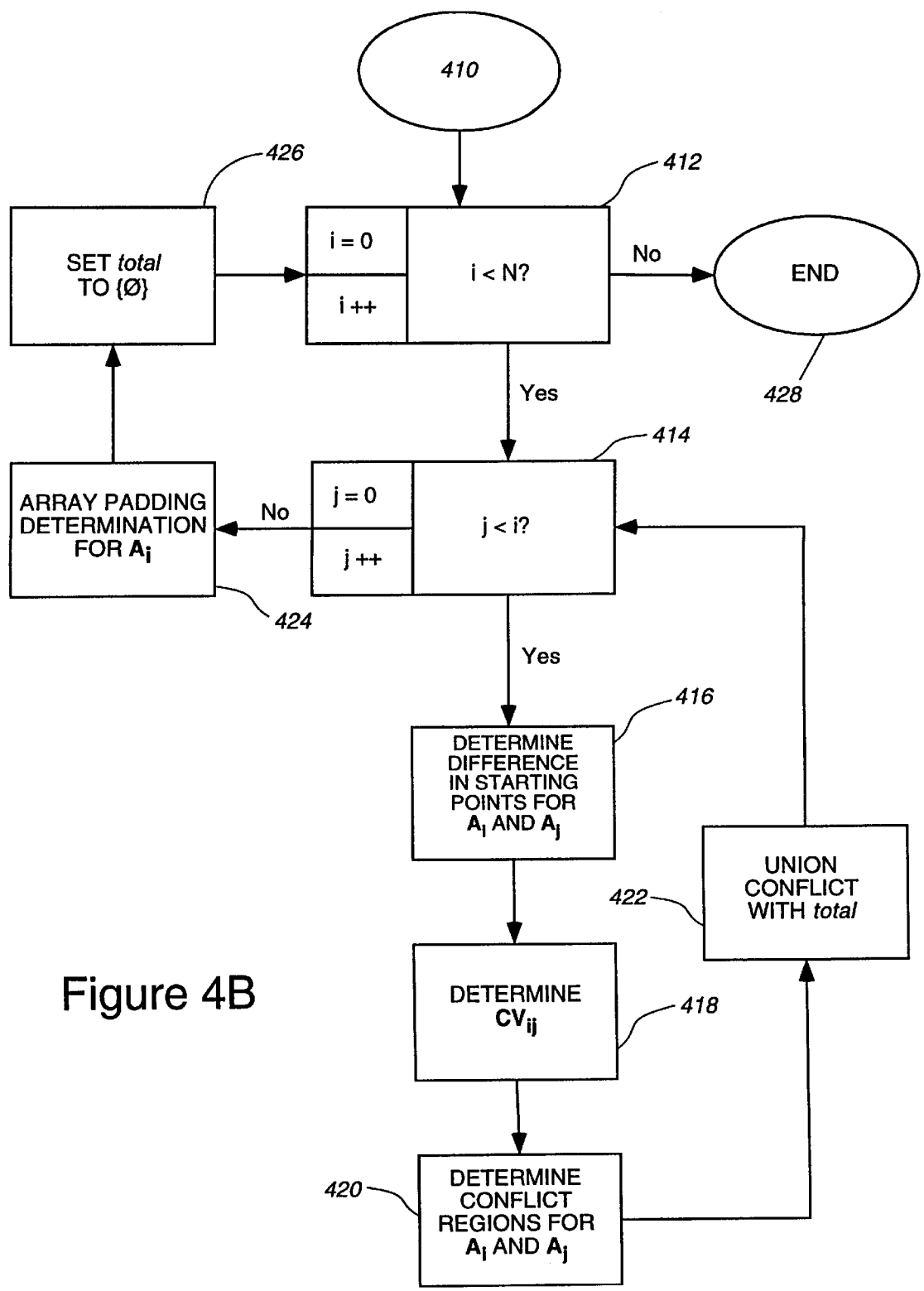

The method of this embodiment of the present invention continues in FIG. 4B at step 412 where the first loop of a double loop are executed so as to determine collision vectors for each pairwise combination of arrays $A_i$ and $A_j$. At step 414 the second loop is entered. At step 416 the difference in the memory addresses between the first array elements of each of the arrays $A_i$ and $A_j$ is determined using standard techniques. At step 418 the collision vector $CV_{ij}$ is determined from this difference using the method described in FIG. 5 below. Next, at step 420, the conflict regions for $A_i$ and $A_j$ are determined as described below with respect to FIG. 6. At step 422 the conflict regions are unioned with total, and loop 414 is executed again for the case where j is less than i. Steps 424 and 426 are executed when j is no longer less than i, and, the process of padding for the next array is continued at step 412. When i has reached N, the total number of arrays determined in step 408, the procedure terminates at step 428.

Figure 5:
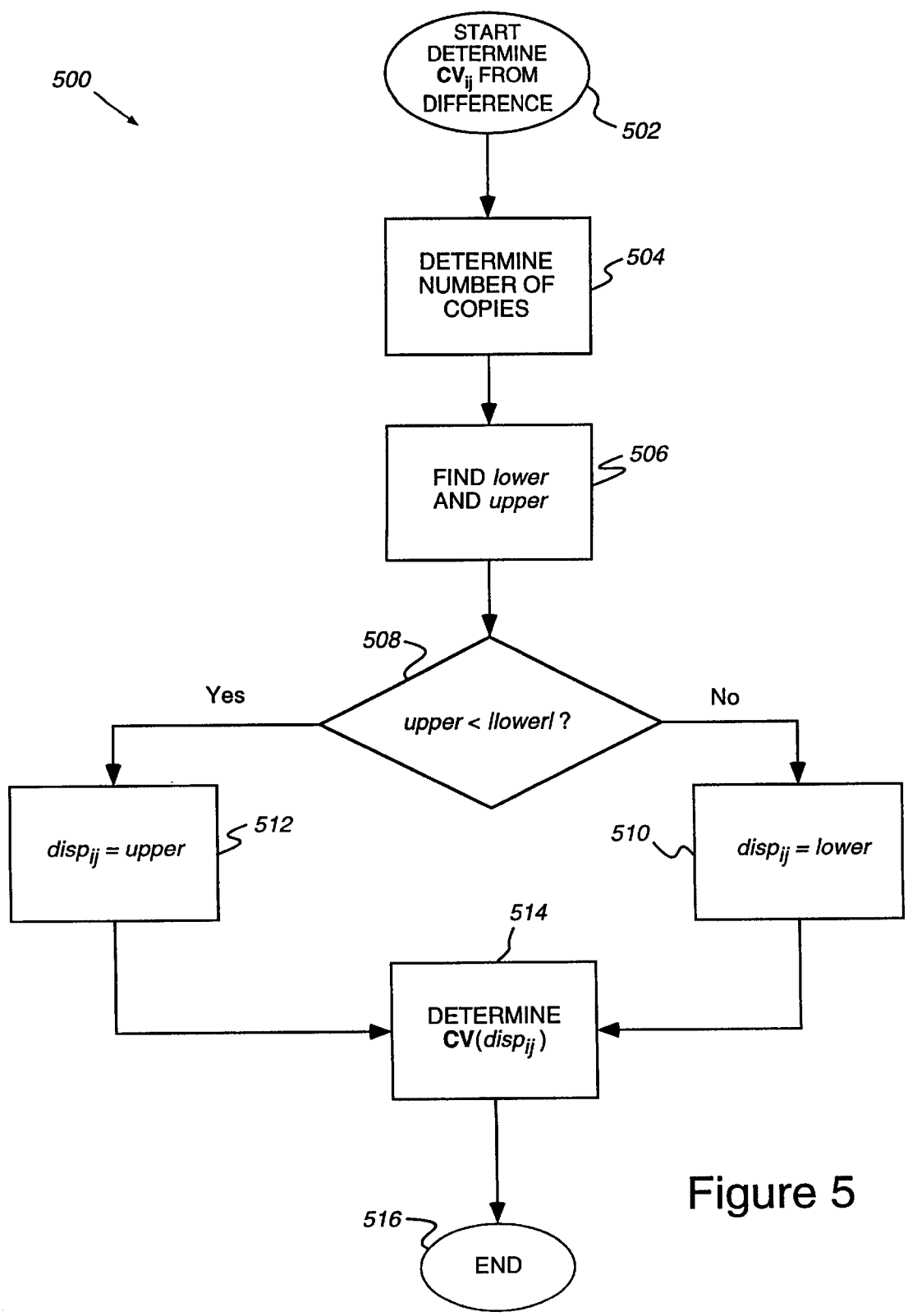
FIG. 5 illustrates in greater detail step 418 of FIG. 4B.

Step 418 of FIG. 4B, the determination of $CV_{ij}$, is shown in greater detail with respect to FIG. 5 at 500. Beginning at step 502, the floor of the ratio of the relative displacement of the arrays $A_i$ and $A_j$ (relativedisp) to the cache size (i.e., $\lfloor \text{relativedisp}/C \rfloor$) is determined at step 504 and is stored as the variable copies. At step 506 the values of the variables upper and lower are determined at 506 using the formulas below (Equation 3)

lower=copies·C−relativedisp upper=(copies+1)·C−relativedisp         Equation 3 where copies is the ratio determined in step 504 above, C is the cache size (in units of array element size), and relativedisp (in the same units) is the relative displacement determined for the arrays $A_i$ and $A_j$ in step 416 above. At step 508 a determination is made as to whether the variable upper has a value less than the absolute value of lower (|lower|). If the determination at 508 is negative, i.e., |lower| has a value less than upper, then, at step 510, the variable $\text{disp}_{ij}$ is set equal to lower. Otherwise the value of $\text{disp}_{ij}$ is set to upper at step 512 and the procedure continues as just described. At step 514 the value of $CV(\text{disp}_{ij})=CV_{ij}$ is determined at step 514 using the procedure described above for determining CSV, and the procedure terminates at step 516.

It will appreciated by those having skill in the computer science arts that the foregoing sequence of operations (including the value of C) implicitly uses the cache shape vector. This sequence represents a more computationally efficient implementation of the method of the invention. An embodiment of the present invention which utilizes more explicitly the cache shape vector will now be provided.

One implementation of the above-described method in shown below. The procedure "calc_collision" calculates the collision vector "collision" from the displacement "disp" using the "basis" for an* array of "n" dimensions. The variables "basis" and "collision" are arrays of length "n" plus one. The content of "basis" is defined in terms of the array "sizes" containing the size of each dimension of the array that the collision vector is to be calculated for are as follows: basis[0]=1; basis[i]=basis[i−1]*sizes[i−1].

```
void calc_collision(int *collision, int disp, int
*basis, int n){
    int i, sign, d, rempos, remneg;
    for(i=n-1;i>=0;--){
        if(disp<0){
            disp = -disp;
            sign = -1;
        } else {
            sign = 1;
        }
        d = disp / basis[i];
        rempos = disp - d * basis[i+1];
        remneg = rempos - basis[i+1];
        if (rempos <= abs(remneg)) {
            disp = sign * rempos;
            collision[i+1] = sign * d;
        } else {
            disp = sign * remneg;
            collision[i+1] = sign * (d + 1);
        }
    }
    collision[0] = disp;
    return;
}
```

Having determined CSV and $CV(\text{disp}_{ij})$ the likelihood of a cache conflict arising between arrays $A_i$ and $A_j$ can be determined. A collision can be expected to occur when the collision vector derived from the relative displacement of the arrays $A_i$ and $A_j$, $CV_{ij}$, is a multiple of CSV, the collision shape vector. Alternatively, instead of calculating the collision vector from the relative displacement of the array addresses, a collision vector can be derived for each array $A_i$ and $A_j$ individually as described below. If the difference of the individual collision vectors is a multiple of CSV, a collision is likely.

Again without wishing to be bound to any particular theory of operation, it has been determined that arrays having shapes that are similar to those of the cache in addition to similar access patterns are likely to suffer cache collisions. These requirements arise from the observation that in general collisions will occur repeatedly only if the array addresses are separated by a constant distance in memory and fall into similar patterns of access, such as often occurs when arrays are being called from within loops. The above-described method accounts for these factors and provides a method for determining the location within the cache, relative to the size of the array in question, collisions are likely to occur.

By way of example consider the arrays X and Y, each being a square array of dimension D=257, and each being stored in a 64-bit cache. Thus, each of the arrays X and Y is 66,049 words in length and the cache is 65,536 words. Applying the above-described calculations to these conditions we see that CSV is (1, −2, 1). The displacement of X and Y is $257^2$ (=66,049), so $CV_Y$ is (0, 0, 1). The array element X(i, j) can therefore be rewritten as $X_0$(i, j, 0) and Y(i, j) can be rewritten as $X_0$(i, j, 1). Similarly, Y(i+1, j−2) can be rewritten as $X_0$(i+1, j−2, 1). The difference of $X_0$(i, j, 0) and $X_0$(i+1, j−2, 1) is (1, −2, 1), the value of CSV. Thus, cache collisions can be expected between these array elements. Similarly, collisions can be expected between X(i, j+1) and Y(i+1, j−1) and X(i−1, j+1) and Y(i, j−1) since their differences are also (1, −2, 1), the value of CSV. Appropriate padding is therefore required to break up this undesirable pattern.

To determine the necessary padding, the ranges forming the regions of conflict in the cache are determined. The determination of the conflict regions between the arrays is illustrated in greater detail at 600 in FIG. 6. Beginning with step 602 the variable conflict region is set to null at step 604. At step 606 the first of a series of nested loops is begun in which the loop index $k_2$ is looped with respect to the variable $top_2$ from $k_2$=$bottom_2$ in unit increments in the first loop. The nested loops continue to the $n^{th}$ loop at 608 in which $k_n$ is looped with respect to the variable $top_n$ from $k_n$=$bottom_n$ in unit increments. The variables $top_i$ and $bottom_i$ are determined as shown in Equation 4 below.

$$top_i = CV_i - MinIndex(X,i) + MaxIndex(Y,i)$$

$$bottom_i = CV_i - MaxIndex(X,i) + MinIndex(Y,i) \qquad \text{Equation 4}$$

In Equation 4 the terms MaxIndex(X,i) and MinIndex(X,i) refer to the respective maximum and minimum values of the constant terms in the addressing expression for the $i^{th}$ index of array X. $CV_i$ is the value of the $i^{th}$ element of the collision vector for X and Y. These terms can be derived using methods known in the computer science arts.

Within loop 608 the variable conflict region is unioned with the variable conflict interval and the loop returns to loop 606. Conflict interval is the interval defined below (Equation 5).

conflict interval=$[d(bottom_1, i_2, \ldots, i_n, CV_{n+1})-(line-1), d(top_1, i_2, \ldots, i_n, CV_{n+1})+(line-1)]$ \hfill Equation 5

The quantity line is the cache line length, which is specific to the particular cache being used and which can be determined using standard methods. Including the factors±(line−1) in conflict interval accommodates any uncertainty in the value of the displacement between the arrays. The functions $d(bottom_i, i_2, \ldots, i_n, CV_{n+1})$ and $d(top_i, i_2, \ldots, i_n, CV_{n+1})$ are defined in Equation 6 below $$d(i_1, \ldots, i_{n+1}) = B_{n+1} \cdot i_{n+1} + \sum_{j=1}^{n} B_j \cdot (i_j - 1) \qquad \text{Equation 6}$$

where $B_i$ is the $i^{th}$ element of the numerical base vector B defined above in Equation 2.

When the nested loops are completed, a wrapping of the conflict ranges about the memory caches determined at steps 612 to accommodate situations in which the conflict ranges overflow from the top of the cache to the bottom (and vice versa) and the procedure terminates at step 614. In one embodiment, the wrapping is performed using the following method: Every ordered pair of lower (l) and upper (u), [l, u], contained in conflict region for which l<0 is obtained and replaced with [C+l, C+u] if u<0; otherwise the pair [l, u] is replaced with [C+l, C−l].

Figure 6:
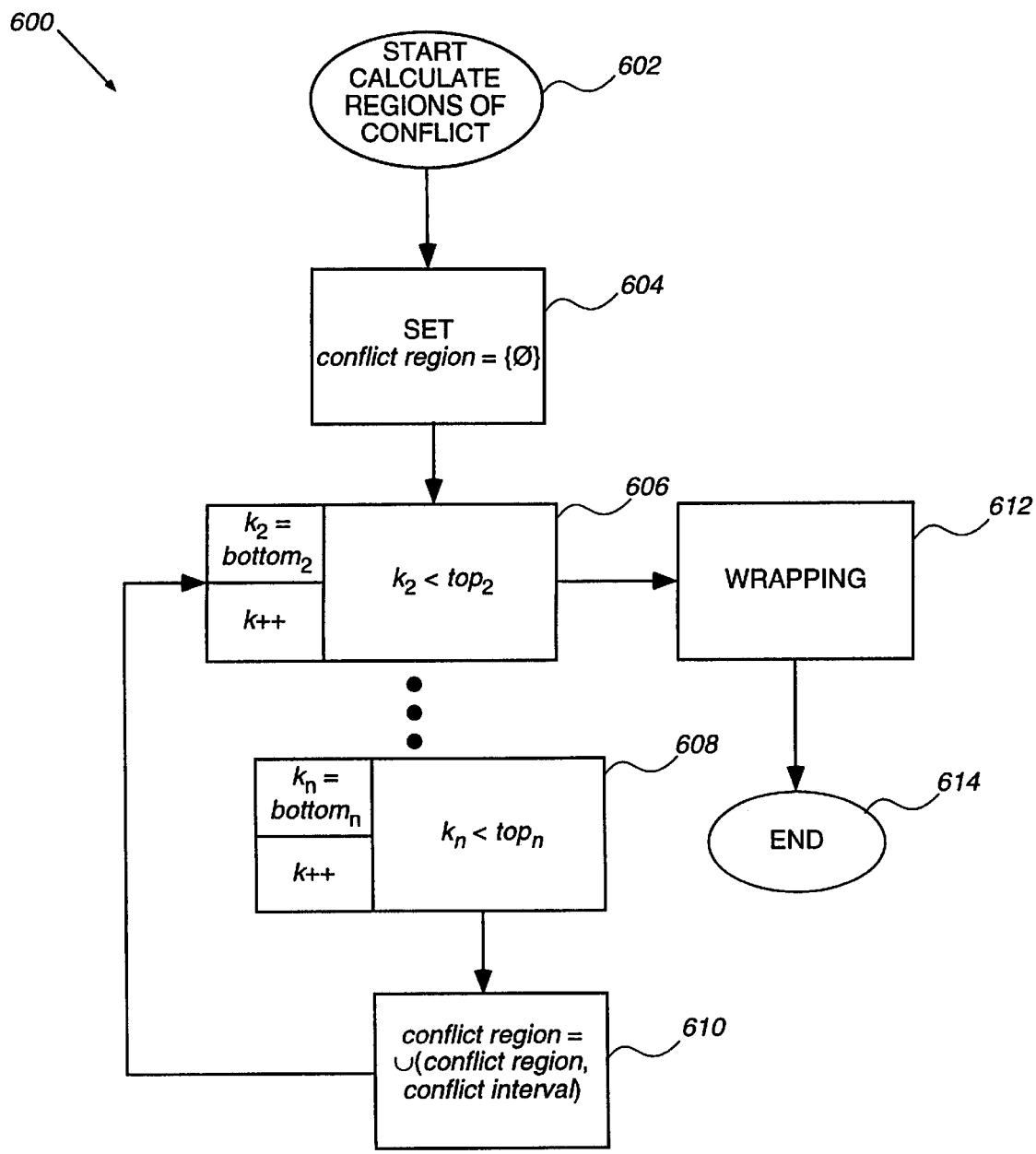
FIG. 6 illustrates in greater detail step 420 of FIG. 4B.
Figure 7:
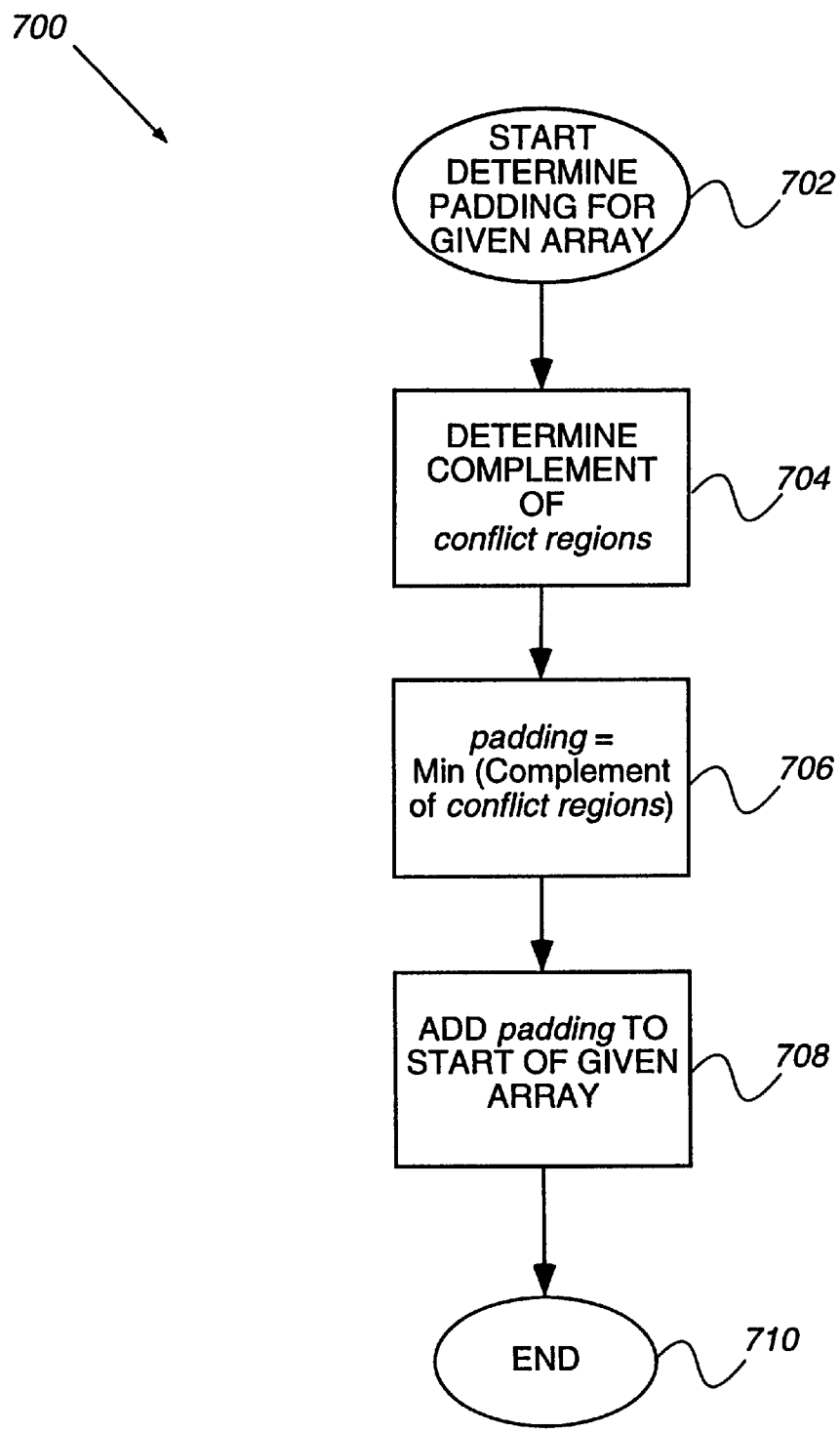
FIG. 7 illustrates in greater detail step 424 of FIG. 4B.

FIG. 7 illustrates in greater detail the determination of the array padding (step 424 of FIG. 4B) at 700. Beginning with step 702, the complement of conflict regions, which was determined with respect to the scheme shown at 600 in FIG. 6, is determined at step 704. At step 706 the padding to be inserted between the arrays is the minimum of the complement of conflict regions. At step 708 the padding value is added to the initial address of the specified array in the main memory. The procedure terminates at step 710. The foregoing steps can be implemented using techniques that are standard in the computer science arts.

An example of the use of the method provided by the invention to determine array padding is presented below. This example is provided solely for the purpose of illustration and is not to be construed in any way as limiting the scope of the present invention.

Assume three arrays A, B, and C, each comprising dimensions of 257×257 words, similar to those used in the well-known Tomcatv benchmark, and a 65K (double words) cache with a line that holds eight double words. A collision vector between A and B of (1, −2, 0) was derived as described above to generate ranges in which cache collisions are likely to occur. Assume for this Example that the offsets occurring in the code are {−2, −1, 0, 1, 2}. (In general, the offsets will be small numbers.) An expanded interval for the first dimension of [−11, +11] is used which reflects the cache line size of 8 plus additional offsets introduced by software pipelining (which effectively increases the range of the offsets in the first dimension).

Applying these ranges to the collision vector (1, −2, 0) yields digit ranges of the form ([−10, 12], [−4, 0]) in base 257 arithmetic. These ranges are then translated to decimal form. In this case that leaves 1±11, −256±11, −513±11, −770±11, and −1027±11; that is: {[−10, 12], [−267, −245], [−524, −502], [−781, −759], [−1038, −1016]}. Negative range offsets are then adjusted modulo the cache size, giving the set of interval ranges to be avoided: {[65525, 65535], [0, 12], [65269, 65291], [65012, 65034], [64755, 64777], [64498, 64520]}.

Having defined the ranges are to be avoided, the complement is found to get a valid padding set. Thus array B against array A yield the following set of paddings: {(64520, 64755), (64777, 65012), (65034, 65269), (65291, 65525), (12, 64498) }. Adjusting the endpoints to obtain closed intervals yields: {[64521, 64754], [64778, 65011], [65035, 65268], [65292, 65524], [13, 64497]}. So the amount of padding that needs to be inserted between A and B is 13 double words.

Using the procedure described above, array C against array A yields the following set of paddings: {[0, 63971], [63995, 64228], [64252, 64485], [64509, 64742], [64766, 64999], [65023, 65535]}. Similarly, array C against array B yields the set of paddings: {[13, 64497], [64521, 64754], [64778, 65011], [65035, 65268], [65292, 65525]}. The intersection of these paddings provides: {[13, 63971], [63995, 64228], [64252, 64485], [64521, 64742], [64778, 64999], [65035, 65268], [65292, 65525]}. Thus, the amount of padding that needs to be inserted between B and C is also 13 double words.

In another embodiment, the method and apparatus of the present invention can be used to prevent cache conflicts between subarrays. An array declared as $X(j_1, \ldots, j_m)$ is a subarray of another array declared as $Y(k_1, \ldots, k_n)$ if m<n and for i from 1 to m $j_i=k_i$. The method given herein takes advantage of the fact that Y can be represented as a set of r arrays $Y_1, \ldots, Y_r$, each having the same shape as X, where r is defined as follows (Equation 7):

$$r = \prod_{i=m+1}^{n} k_i \qquad \text{Equation 7}$$

In this embodiment of the present invention, r collision vectors are constructed by comparing X with each of $Y_1, \ldots, Y_r$, and then finding r sets of possible paddings the intersection of which is the set of valid padding between X and Y. The paddings are applied to only those arrays that are equal in shape or satisfy the above-described subarray relationship.

In still another embodiment, the method and apparatus of the present invention can be used to handle misaligned objects having a size other than a power of two. In this embodiment, the basis is extended with a new first element representing a unit of alignment so that the basic array element is divisible by some unit of storage that is a power of two. In this embodiment, the values for upper and lower described above are modified as described below:

$d(\text{bottom}_i, i_2, \ldots, i_n, V_{n+1})-(\text{line}-1)+V_0(\text{lower})$ $d(\text{top}_i, i_2, \ldots, i_n, V_{n+1})+(\text{line}-1)+V_0+B_1-1$ (upper)

where V and B each have a new zeroth element for the new alignment unit. Misalignment of arrays is handled by adding one (1) to the upper limit of each range. This padding process aligns the array to the basic storage unit.

The above-described embodiments can be applied to caches that use direct mapping or to associative caches. If associative caches are used, then the effective cache size is the actual cache size divided by the associativity factor. The above-described embodiments cannot be employed with caches that use address hashing to minimize collisions.

The computational efficiency of the embodiments describe above can be improved by limiting the number of arrays that are considered when calculating the padding of a given array to only those arrays that are used simultaneously (i.e., in the same loop). In addition, if the access patterns of two arrays differ (e.g., a column access and a row access), the arrays will not collide. Thus, computational efficiency can be further improved by checking the access patterns of the arrays. Still another approach to improve the execution speed is to decrease the size of the region of conflict by using improved information about the range of the indices. This information can be determined by examination of the source codes using standard methods known in the computer science arts.

Thus it will be seen that the present invention provides an efficient method for detecting and resolving cache conflicts between arrays stored in the main memory of a computer system which arrays are loaded into a memory cache. Using the method and apparatus of the invention, a cache size vector can be determined which is indicative not only of the particular size of the cache but also of the dimensionality of the cache. Arrays whose collision vectors have differences that are multiples of the cache size vector are then determined to require padding. The padding can be provided by determining the total conflict regions and adjusting for the size of the cache. Thus the present invention will be seen to provide an efficient method for resolving cache conflicts that does not require brute force calculations or memoization.

Although the foregoing invention has been described in some detail for purposes of clarity of understanding, it will be apparent that certain changes and modifications may be practiced within the scope of the appended claims as described hereinabove.

The following materials are incorporated by reference in their entirety for all purposes.

1. Ralston, Anthony, and Reilly, Edwin D. 1993. *Encyclopedia of Computer Science.* Van Norstrand Reinhold.

2. Bacon, David F., et al. 1994. *A Compiler Framework for Restructuring Data Declarations to Enhance Cache and TLB Effectiveness.* Proceedings CASCON '94, Toronto, Canada, Oct. 31–Nov. 3 1994.

3. Herzog, James H. 1996. *Design and Organization of Computing Structures.* Franklin, Beedle & Associates, Inc.

What is claimed:

1. In a computer system including a microprocessor coupled with a memory cache, the memory cache being coupled with a main memory having data arrays stored therein that are suitable for loading into the memory cache for processing by the microprocessor, a computer-implemented method for identifying and resolving cache conflicts, the method comprising the steps of:

determining under computer control a cache shape vector which characterizes a size and dimension of the memory cache;

determining under computer control at least one cache conflict among the arrays stored in the main memory;

determining under computer control a conflict region for the conflicting arrays stored in the main memory;

determining under computer control a padding value for the arrays stored in the main memory; and adjusting under computer control locations of the stored, conflicting arrays in the main memory in accordance with the padding value and by adding the padding value to the main memory address of each array stored in the main memory to prevent cache conflicts when the stored arrays are transferred and loaded into the memory cache.

2. The computer-implemented method of claim 1, wherein the step of determining the cache shape vector comprises the steps of:

determining under computer control a numeric value corresponding to the size of the cache; and converting under computer control the numeric value of the size of the cache to a numeric base defined by the dimensions of the stored arrays to derive therefrom the cache shape vector.

3. The computer-implemented method of claim 1, wherein the step of determining at least one cache conflict comprises the steps of:

determining under computer control a collision vector for two arrays stored in the main memory; and determining whether the collision vector is an approximate multiple of the cache shape vector.

4. The computer-implemented method of claim 3, wherein the step of determining a collision vector comprises the steps of:

determining under computer control the number of copies of each array invocation;

determining under computer control the displacement of the arrays in the main memory; and converting under computer control the numeric value of the displacement to the same numeric base as the collision vector.

5. The computer-implemented method of claim 1, wherein the step of determining conflict regions comprises the steps of:

determining under computer control a conflict interval for each pairwise combination of arrays in the main memory;

determining under computer control the union of all conflict intervals to determine the conflict region; and wrapping under computer control the conflict region.

6. The computer-implemented method of claim 1, wherein the step of determining the padding comprises the step of determining under computer control the minimum of a complement of a union of the conflict regions.

7. A computer system including a microprocessor coupled with a memory cache, the memory cache being coupled with a main memory having data arrays stored therein that are suitable for loading into the memory cache for processing by the microprocessor, the memory addresses for the data arrays stored in the main memory being separated by padding regions determined using the method of claim 1.

8. A computer readable medium comprising computer readable code devices embodied therein for defining in the main memory of a computer system in which the main memory is coupled with a memory cache, said memory cache coupled with a microprocessor, the main memory being defined such that arrays stored in the main memory are loaded into the memory cache for processing by the microprocessor, said arrays including at least two arrays whose locations in the main memory are separated by padding regions determined using the method of claim 1.

9. A computer system configured to prevent cache conflicts among arrays stored in a main memory coupled with a memory cache, comprising:

a microprocessor coupled with the memory cache;

a main memory coupled with the memory cache, said main memory having stored therein at least two data arrays;

data pathway and data loading mechanisms effective to transfer at least a portion of the arrays stored in the main memory to the memory cache and load the transferred portion of the arrays into the memory cache;

a cache conflict detection mechanism effective to determine the presence of cache conflicts between the arrays stored in the main memory, the cache conflict mechanism including a cache shape vector determination mechanism; and a padding mechanism effective to adjust the main memory locations of the stored arrays to prevent cache conflicts when the stored arrays are transferred and loaded into the memory cache.

10. The computer system of claim 9, wherein the cache conflict mechanism further includes a conflict region determination mechanism.

11. The computer system of claim 10, wherein the cache shape determination mechanism comprises a cache size evaluator effective to determine the size of the cache and a cache size converter to express the size of the cache into a numeric base defined by the dimensions of the stored arrays to derive therefrom the cache shape vector.

12. The computer system of claim 10, wherein the conflict region determination mechanisms further includes a wrapping mechanism.

13. The computer system of claim 10, wherein the cache conflict mechanism further includes a cache vector determination mechanism.

14. The computer system of claim 13, wherein the cache conflict mechanism includes a conflict discriminator that determines whether the collision vector is an approximate multiple of the cache shape vector.

15. A computer program product comprising a computer usable medium having computer readable code devices embodied therein for identifying and resolving cache conflicts among data arrays stored in the main memory of a computer system in which the data arrays are loaded into a memory cache for processing by a microprocessor, the computer program product comprising:

computer readable code devices for determining under computer control a cache shape vector which characterizes the size and dimension of the memory cache;

computer readable code devices for determining under computer control at least one cache conflict between the data arrays stored in the main memory;

computer readable code devices for determining under computer control a conflict region for a conflicting arrays stored in the main memory;

computer readable code devices for determining under computer control a padding value for the conflicting arrays stored in the main memory; and computer readable code devices for adjusting under computer control locations of the stored, conflicting arrays in the main memory in accordance with the padding value and by adding the padding value to the main memory address of each array stored in the main memory to prevent cache conflicts when the stored arrays are transferred and loaded into the memory cache.

16. The computer program product of claim 15, wherein the computer readable program code devices for determining a cache shape vector comprise:

computer readable program code devices configured to cause a computer to determine under computer control a numeric value corresponding to the size of the cache; and computer readable program code devices configured to cause a computer to convert under computer control the numeric value of the size of the cache to a numeric base defined by dimensions of the stored arrays to derive therefrom the cache shape vector.

17. The computer-implemented method of claim 16, wherein the computer readable program code devices configured to cause a computer to determine at least one cache conflict comprise:

computer readable program code devices configured to cause a computer to determine under computer control a collision vector for two arrays stored in the main memory; and computer readable program code devices configured to cause a computer to determine whether the collision vector is an approximate multiple of the cache shape vector.

18. The computer-implemented method of claim 17, wherein the computer readable program code devices configured to cause a computer to determine conflict regions comprise:

computer readable program code devices configured to cause a computer to determine under computer control a conflict interval for each pairwise combination of arrays in the main memory;

computer readable program code devices configured to cause a computer to determine under computer control a union of all conflict intervals; and computer readable program code devices configured to cause a computer to wrap under computer control the conflict region.

19. The computer-implemented method of step 18, wherein the computer readable program code devices configured to cause a computer to determine a collision vector comprise:

computer readable program code devices configured to cause a computer to determine under computer control a number of copies of each matrix invocation;

computer readable program code devices configured to cause a computer to determine under computer control a displacement of the data arrays; and computer readable program code devices configured to cause a computer to convert under computer control the numeric value of the displacement to the same base as the collision vector.

20. The computer-implemented method of claim 19, wherein the computer readable program code devices configured to cause a computer to determine the padding value comprise computer readable program code devices configured to cause a computer to determine under computer control the minimum of a complement of a union of the conflict regions.

* * * * *